United States Patent [19]

Nolan et al.

[11] Patent Number: 5,253,362
[45] Date of Patent: Oct. 12, 1993

[54] METHOD FOR STORING, RETRIEVING, AND INDICATING A PLURALITY OF ANNOTATIONS IN A DATA CELL

[75] Inventors: Lorene S. Nolan, San Pedro, Calif.; Ronald E. Norden-Paul; Richard E. Shelton, both of Mesa, Ariz.; Sandra L. Stewart, Phoenix, Ariz.

[73] Assignee: Emtek Health Care Systems, Inc., Tempe, Ariz.

[21] Appl. No.: 471,445

[22] Filed: Jan. 29, 1990

[51] Int. Cl.⁵ .............................................. G06F 15/40
[52] U.S. Cl. ........................... 395/600; 364/DIG. 2; 364/974; 364/963; 364/948.2; 395/144; 395/156
[58] Field of Search .................. 395/600, 144, 156

[56] References Cited

U.S. PATENT DOCUMENTS

| | | | |
|---|---|---|---|
| 3,670,310 | 6/1972 | Bharwani et al. | 340/172.5 |
| 4,315,309 | 2/1982 | Coli | 364/200 |
| 4,481,603 | 11/1984 | McCaskill et al. | 364/900 |
| 4,658,366 | 4/1987 | Posh | 364/523 |
| 4,737,912 | 4/1988 | Ichikawa | 364/413 |
| 4,807,123 | 2/1989 | Komatsu et al. | 364/200 |
| 4,837,693 | 6/1989 | Schotz | 364/408 |
| 4,851,999 | 7/1989 | Moriyama | 364/401 |

FOREIGN PATENT DOCUMENTS 0211151 2/1987 European Pat. Off. .

OTHER PUBLICATIONS

Dale C. J. An Introduction to Database Systems Addison-Wesley 1983 p. 182.
Scheifler & Gettys, the X Window System, ACM Transactions on Graphics, vol. 5, No. 2, pp. 79-109 (4186).
Ulticare—A bedside patient care information system, Health Data Sciences (Oct. 1984).
Poole et al., your Atar: Computer, pp. 405-411, Osborne/McGraw-Hill (1982).
PDMs—Patient Data Managment System—System Description, Hewlett Packard Jan. 1982.
PDMs—Patient Data Management System—Clinical User's Guide, Hewlett Packard Jan. 1982.
Brimm, Computers in Critical Care, Critical Care Nursing Quarterly vol. 9, No. 4, pp. 53-63 (1987).

*Primary Examiner*—Thomas C. Lee
*Assistant Examiner*—Peter Y. Wang
*Attorney, Agent, or Firm*—Harold C. McGurk; Walter W. Nielsen; Raymond Warren

[57] ABSTRACT

Annotations to data objects are stored in the object instance and may be stored in an annotation file or a reference may be store in a reference file. Once annotated, a cell displaying the data object will provide a notation indicating that the data object has an annotation associated therewith. Retrieval of annotations which are not stored in an annotation file or reference file occurs through a search of the object instances. Retrieval of annotations having a reference in a reference file occurs through use of the reference to access the object instances. Retrieval of annotations in an annotation file occurs through retrieval of the annotation file. Once retrieved, the annotations may be in a final form, such as the nursing progress notes, or may be on a scratch pad to allow the user to electronically transfer annotations from a scratch pad to a permanent record.

3 Claims, 15 Drawing Sheets

| | | 7/7 10:30 | 7/7 11:00 | 7/7 11:30 | 7/7 12:00 | 7/7 12:30 | 7/7 13:00 |
|---|---|---|---|---|---|---|---|
| VITALS *453A* | | *453B* *453C* | | *453C* | *453C* | | |
| *454A* | HEART RATE | *454B* | *454C* | | *454C* | *454C* | |
| *455A* | BLOOD PRESSURE | *455B* | | *455C* | | | |
| *456A* | TEMP. | *456B* | | | | *456C* | |
| | RESPIRATION RATE | | | | | | |
| LABS *457A* | CBC HGB | *457B* | *457C* | | | | |
| *458A* | CBC HCT | *458B* | | | *458C* | | |
| *459A* | K+ | *459B* | | *459C* | | | *459C* |
| *460A* | Na | *460B* *460C* | *460C* | | | *460C* | |
| *461A* | BUN | *461B* | | | *461C* | | |
| *462A* | CREAT | *462B* | | *462C* | | | |

*450*

| | | 7/7 10:30 | 7/7 11:00 | 7/7 11:30 | 7/7 12:00 | 7/7 12:30 | 7/7 13:00 |
|---|---|---|---|---|---|---|---|
| VITALS 453A | | 453B 453C | | 453C | 453C | | |
| 454A | HEART RATE | 454B | 454C | | 454C | 454C | |
| 455A | BLOOD PRESSURE | 455B | | 465 | | | |
| 456A | TEMP. | 456B | | 455C | | 456C | |
| LABS 457A | RESPIRATION RATE | 457B | 457C | | | | |
| 458A | CBC HGB | 458B | | | | 458C | |
| 459A | CBC HCT | 459B | 459C | | | | 459C |
| 460A | K+ | 460B 460C | 460C | | | 460C | |
| 461A | Na | 461B | | | 461C | | |
| 462A | BUN | 462B | | 462C | | | |
| | CREAT | | | | | | |

Popup 470:
(1) MAKE ENTRY
(2) CORRECT ENTRY
(3) SHOW DETAIL
(4) NURSING ANNOTATION
(5)
(6)
(7)

FIG. 3  450

| | | 7/7 10:30 | | 7/7 11:00 | 7/7 11:30 | 7/7 12:00 | 7/7 12:30 | 7/7 13:00 |
|---|---|---|---|---|---|---|---|---|
| VITALS 453A | | | | | | | | |
| 454A | HEART RATE | 453B | 453C | | 453C | 453C | | |
| 455A | BLOOD PRESSURE | 454B 90/70 | | 90/70 | 105/70 (465) | | | |
| 456A | TEMP. | 455B | | | 455C | | | |
| | RESPIRATION RATE | 456B | | | | | | |
| LABS 457A | CBC HGB | 457B | | | | | | |
| 458A | CBC HCT | 458B | | | | | | |
| 459A | K+ | 459B | | 459C | | | | 459C |
| 460A | Na | 460B 460C | | 460C | | | 460C | |
| 461A | BUN | 461B | | | | 461C | | |
| 462A | CREAT | 462B | | | 462C | | | |

PARAMETER: BLOOD PRESSURE — 481
DATE: 7/7 — 482   TIME:11:30 — 483
NURSING ANNOTATION: INCREASE IN SYSTOLIC DUE TO ADMINISTRATION OF DOPAMINE HYDROCHLORIDE — 484

FIG. 4

| | | 7/7 10:30 | 7/7 11:00 | 7/7 11:30 | 7/7 12:00 | 7/7 12:30 | 7/7 13:00 |
|---|---|---|---|---|---|---|---|
| 453A↓ VITALS | | 453B 453C | | $a_1$ 95 | 467 453C | | |
| 454A | HEART RATE | 454B 90/70 | 90/70 | $a_1$ 105/70 465 | | | |
| 455A | BLOOD PRESSURE | 455B | | 455C | | 456C | |
| 456A | TEMP. | 456B | | | | | |
| | RESPIRATION RATE | | | | | | |
| LABS 457A | CBC HGB | 457B | | | | | |
| 458A | CBC HCT | 458B | | | | | |
| 459A | K+ | 459B | | | | | 459C |
| 460A | Na | 460B 460C | | | | 460C | |
| 461A | BUN | 461B | 486 | | $a_1$ 15 466 | 468 | |
| 462A | CREAT | 462B | | $a_2$ 0.8 | | | |

SHOW DETAIL
PARAMETER: BLOOD PRESSURE—487
DATA: 7/7—488
TIME: 11:30—489
SYSTOLIC: 105—490
DIASTOLIC: 70—491
AVERAGE: 87.5—492
DATE ENTERED: 7/7—493
TIME ENTERED: 11:38—494
ENTRY BY: A. NURSE—495
NURSE ANNOTATION: INCREASE IN 496
SYSTOLIC DUE TO ADMINISTRATION
OF DOPAMINE HYDROCHLORIDE

| | | 7/7 10:30 | 7/7 11:00 | 7/7 11:30 | 7/7 12:00 | 7/7 12:30 | 7/7 13:00 |
|---|---|---|---|---|---|---|---|
| 453A | | 453B | | 453C | 453C | | |
| VITALS | | | | | | | |
| 454A | HEART RATE 453B | | | | | | |
| 454A | BLOOD PRESSURE 454B | 90/70 | 90/70 | 105/70 | | | |
| 455A | TEMP. 455B | | | 455C | | | |
| 456A | RESPIRATION RATE 456B | | | | | | |
| LABS 457A | CBC HGB 457B | | | | | | |
| 458A | CBC HCT 458B | | | | | | |
| 459A | K+ 459B | | | 459C | | | |
| 460A | Na 460B | 460C | | | | | |
| 461A | BUN 461B | | | | | | |
| 462A | CREAT 462B | | | 462C | | | |

Arrows: 453, 454, 455, 456, 457, 458

465 (box around 105/70)

PARAMETER: BLOOD PRESSURE —481
DATE: 7/7—482    TIME: 11:30—483
NURSING ANNOTATION: ————484————

NURSING ANNOTATIONS
(1) [PATIENT RESTLESS]
(2) PATIENT SENT TO LAB FOR TESTS
(3) PATIENT SENT TO X-RAY
(4) PATIENT PROGRESSING AS ANTICIPATED
(5) PATIENT DISMISSED 480, 498, 450, 451, 452

NURSING PROGRESS NOTES

| DATE | SHIFT | TIME | RN | ANNOTATION |
|---|---|---|---|---|
| 7/7 | 1 | 11:30 | A. NURSE | INCREASE IN SYSTOLIC DUE TO ADMINISTRATION OF DOPAMINE HYDROCHLORIDE |
| 7/7 | 1 | 1:00 | A. NURSE | PATIENT RESTLESS |

FIG. 7A

NURSING PROGRESS NOTES

| DATE | TIME | RN | | ANNOTATION |
|------|-------|-----------|----------------|-------------------------------------------------------|
| 7/7  | 11:30 | A. NURSE  | BP=105/70      | INCREASE IN SYSTOLIC DUE TO ADMINISTRATION OF DOPAMINE HYDROCHLORIDE |
| 7/7  | 13:30 | A. NURSE  | HR=95          | PATIENT RESTLESS |
| 7/7  | 20:00 | C. NURSE  | C̄ DSW PARM 20MLg KCl PARM VOL=100cc | AIR IN LINE |

FIG. 7B

NURSING PROGRESS NOTES

| DATE | SHIFT | TIME | RN | ANNOTATION |
|------|-------|------|------|------------|
| 7/7 | 1 | 11:30 | A. NURSE | INCREASE IN SYSTOLIC DUE TO ADMINISTRATION OF DOPAMINE HYDROCHLORIDE |
| 7/7 | 1 | 1:00 | A. NURSE | [PATIENT RESTLESS] |

NURSING ANNOTATIONS (1) PATIENT RESTLESS
(2) PATIENT SENT TO LAB FOR TESTS
(3) PATIENT SENT TO X-RAY
(4) PATIENT PROGRESSING AS ANTICIPATED
(5) PATIENT DISMISSED

*FIG. 8*

NURSING PROGRESS NOTES

| DATE | SHIFT | TIME | RN | ANNOTATION |
|------|-------|------|----|------------|
| 7/7 | 1 | 11:30 | A. NURSE | INCREASE IN SYSTOLIC DUE TO ADMINISTRATION OF DOPAMINE HYDROCHLORIDE |

NURSING PROGRESS NOTES (SCRATCH PAD)

| DATE | SHIFT | TIME | RN | ANNOTATION |
|------|-------|------|----|------------|
| 7/7 | 1 | 11:30 | A. NURSE | INCREASE IN SYSTOLIC DUE TO ADMINISTRATION OF DOPAMINE HYDROCHLORIDE |
| 7/7 | 3 | 23:00 | B. NURSE | PATIENT UNABLE TO SLEEP |

METHOD FOR STORING, RETRIEVING, AND INDICATING A PLURALITY OF ANNOTATIONS IN A DATA CELL

RELATED INVENTIONS

The present invention is related to the following inventions, all assigned to the assignee of the present invention:

System Control Structure of a Hospital Information System and Method of Using Same, having Ser. No. 07/116,614, and filed on Nov. 3, 1987, now abandoned;

Clinical Task List with Charting Through the Task List onto Underlying Form and Automatic Updating of Task List, having Ser. No. 07/268,822, and filed on Nov. 7, 1987, now abandoned;

Clinical Task List with Charting onto Underlying Form and Automatic Updating of Task List, having Ser. No. 07/268,323, and filed on Nov. 7, 1987, now abandoned;

Method for Generating Patient-Specific Flowsheets by Adding/Deleting Parameters, having Ser. No. 07/116,611, and filed on Nov. 3, 1987, now U.S. Pat. No. 4,878,175;

Forms Manager, having Ser. No. 07/322,740, and filed on Mar. 13, 1989, now abandoned;

A Method for Displaying Information from an Information Based Computer System having Ser. No. 07/407,979 and filed on Sep. 15, 1989, now pending;

Spreadsheet Cell having Multiple Data Fields, having Ser. No. 07/408,166 and filed on Sep. 15, 1989, now abandoned;

A Method for Displaying Information from an Information Based Computer System, having Ser. No. 07/407,836 and filed on Sep. 15, 1989, now pending;

Electronic Data Storage Interface, having Ser. No. 07/408,178 and filed on Sep. 15, 1989, now pending;

Method for Updating Data in a Database, having Ser. No. 07/408,167 and filed on Sep. 15, 1989, now abandoned;

Method for Storing a Transaction in a Distributed Database System, having Ser. No. 07/408,164 and filed on Sep. 15, 1989, now pending;

A Method of Forming a Spreadsheet Display, having Ser. No. 07/407,972 and filed on Sep. 15, 1989, now pending; and Data Storage Audit Trail, having Ser. No. 07/409,230 and filed on Sep. 15, 1989, now abandoned.

FIELD OF THE INVENTION

The present invention relates, in general, to a method for annotating data objects and, more particularly, to a method for storing and retrieving data object annotations.

BACKGROUND OF THE INVENTION

The present invention relates to an automated records management system. Such an automated system has utility, for example, in a hospital based patient record keeping system. Patient record keeping systems are used for maintaining a wide variety of separate, often interrelated, types of medical records concerning patients.

Hand written patient record keeping systems have evolved through many years of careful refinement and enhancement into systems which maintain a detailed manual record of medical information concerning each patient. To meet the needs of different hospital entities (such as doctors, nurses, pharmacy, accounting, laboratory, etc.) a manual record keeping system often requires that one piece of information be entered into multiple records.

In a typical manual patient record keeping system a patient chart, usually in the form of a notebook, is maintained at the nursing station for each patient. The notebook is divided into a plurality of individual tabbed sections, such as Physicians Orders, Kardex, Nursing Care Plan, Nursing Assessment, and Laboratory.

Each of the above sections is further subdivided into a number of forms. The forms are those which are appropriate to the individual patient and/or such patient's physician. For example, within the Laboratory section there may appear forms for chemistry, hematology, blood gas, and microbiology.

In addition, a "flowsheet" chart is usually kept at the patient's bedside. On the "flowsheet" chart there are individual areas for medication records, vital signs, intake/output, laboratory results, and other categories which are dependent upon the patient's affliction, such as intravenous (IV) drips.

Referring in particular to nursing functions, annotations to charts and/or nursing progress notes are made manually. Typically, brief notations are jotted down in various places through-out a shift. Sometime during the shift, typically at the end, the nurse makes a full notation into the nursing progress notes based on the brief notations or remembered items. This process can be very inefficient since notations may be forgotten or not copied appropriately.

A further problem is caused by the amount of time required to make such annotations. In addition to transcribing the annotation to the nursing progress notes, it may also be necessary to distribute the notations to other forms, such as a medication form.

One way of replacing the manual charting system is with electronic databases such as described in the patents and applications referenced in the preceding Related Inventions section. Here a visual display is provided in much the same configuration as present manual charts. Each display provides a time/variable spread sheet comprising a plurality of data cells.

A database is a collection of logically organized data items. Generally, a database is organized into tables (or pages) which may contain one or more records (or rows). The records are comprised of one or more fields which contain the data.

In this type of electronic database, a cell in a flowsheet may have a form or report associated with it which expands on the information in the cell. This form may be comprised of various attributes obtained from one or more object instances of one or more object classes. This is similar to "hypertext" which is a process whereby a word or symbol in one document is related, or linked, to another document. This linking can continue from one document to the next in an unlimited manner. An example of this is Apple's ® Hypercard ® software.

An object instance is the instantiation of an object class. An object class is similar to a type (as used in programming languages) in that it defines a structure and a set of processing rules. The information for these flowsheet cells and the underlying forms, comes from a database containing various patient records. Examples of forms and records are found in copending patent applications "A Method of Forming a Spreadsheet Display" and "Spreadsheet Cell having Multiple Data Fields".

Accordingly, it is an object of the present invention to provide a method for storing and retrieving data object annotations which overcome the above deficiencies and provide the desired advantages.

A further object of the present invention is to provide a method for storing and retrieving data object annotations which provide a scratch pad of annotations.

Another object of the present invention is to provide a method for storing and retrieving data object annotations which will fan-out the transcriptions to multiple locations.

Still another object of the present invention is to provide a method for storing and retrieving data object annotations which provide a time and a user identification for each transcription.

Yet another object of the present invention is to provide a method for storing and retrieving data object annotations which provides for consolidation of annotations.

Another object of the present invention is to provide a method for storing and retrieving data object annotations which provides users with the capability to view more complete information surrounding significant events.

These and other objects and advantages are achieved in accordance with a preferred embodiment of the invention described below.

SUMMARY OF THE INVENTION

A particular embodiment of the present invention consists of a method for storing and retrieving data object annotations including automatic transcription. Data on a patient's medical chart may be annotated by the health care provider, such as the nurse. These annotations are then fanned-out to other forms, such as the nursing progress notes and medication forms. This fan-out may be performed automatically or by providing the nurse with a scratch pad of annotations, which may be copied directly to the progress notes or enhanced prior to entry.

BRIEF DESCRIPTION OF THE DRAWINGS

FIG. 5 is an illustration of the screen of FIG. 2 showing the detail of an annotated cell;

FIGS. 12A-12C are flow charts illustrating several embodiments of the retrieval process embodying the present invention.

DETAILED DESCRIPTION OF THE DRAWINGS

While the following description is for a particular embodiment of the present invention, it will be understood by those skilled in the art that the present invention has application in any type of data collection environment.

Figure 1:
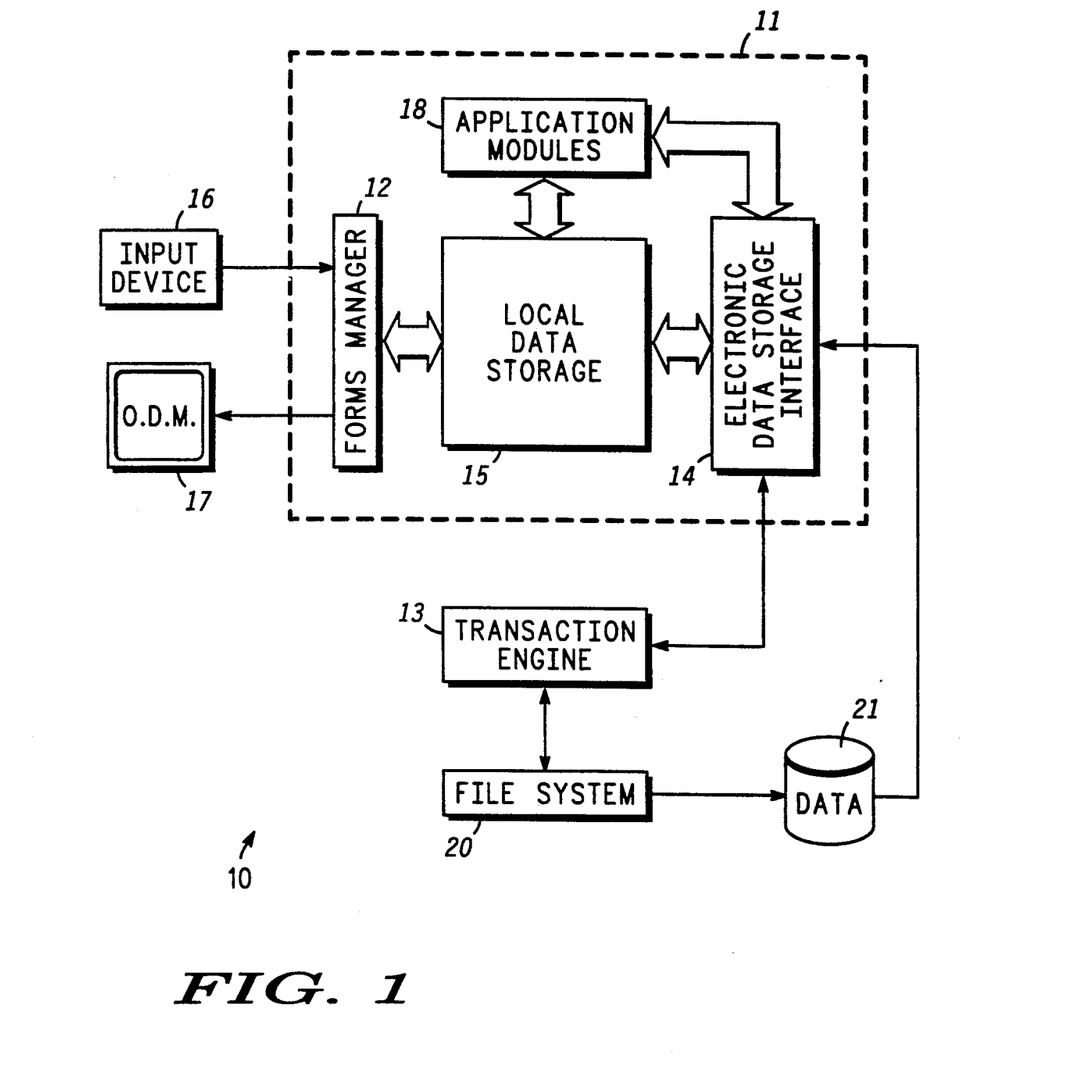
FIG. 1 is a block diagram representing the function of a data processing system incorporating the present invention.

Referring initially to FIG. 1, a block diagram, generally designated 10, representing the function of a system embodying the present invention is illustrated. A process 11 is designated by a dashed box. Process 11 consists of a forms manager 12 (described in detail in co-pending patent application "Forms Manager"), an electronic data storage interface 14 (described in detail in copending patent application "Electronic Data Storage Interface"), a local data storage 15, and application modules 18.

These various utilities interact with each other and with elements external to process 11. Some of the external elements consist of a transaction engine 13 (described in more detail in copending patent application "Method for Storing a Transaction in a Distributed Database System"), an input device 16 (such as a keyboard, touch sensitive screen, light pen, mouse, or the like) and an operator display module 17 (such as a CRT, LCD display, gas plasma display, or the like). It is possible for input device 16 and ODM 17 to be one physical device, such as in the case of a touch sensitive screen.

In addition, a file system 20 is present to manage database 21. Interface 14 interacts with file system 20, through transaction engine 13, to produce the data copied in local data storage 15.

Within database 21 are all object instances of object classes which have been instantiated. An object class is the definition of the structure of object instances of the object class and the hierarchical relationship of the object class with respect to other object classes. An object class is similar to a type (as used in programming languages). An object instance is an instantiation of an object class. An object instance is similar to a data item of a particular type. In this particular embodiment, an object instance consists of a row label and the time-dependent data associated therewith. An object class may have one or more object instances. The collection of object instances is a set of records. Object classes and object instances are described in more detail in copending patent application "Electronic Data Storage Interface".

When data is required by application 18, a message is sent to electronic data storage interface 14. Interface 14 then directs file system 20, through transaction engine 13, to provide a working subset of a database 21 to interface 14. Interface 14 then places this working subset in local data storage 15.

Figure 2:
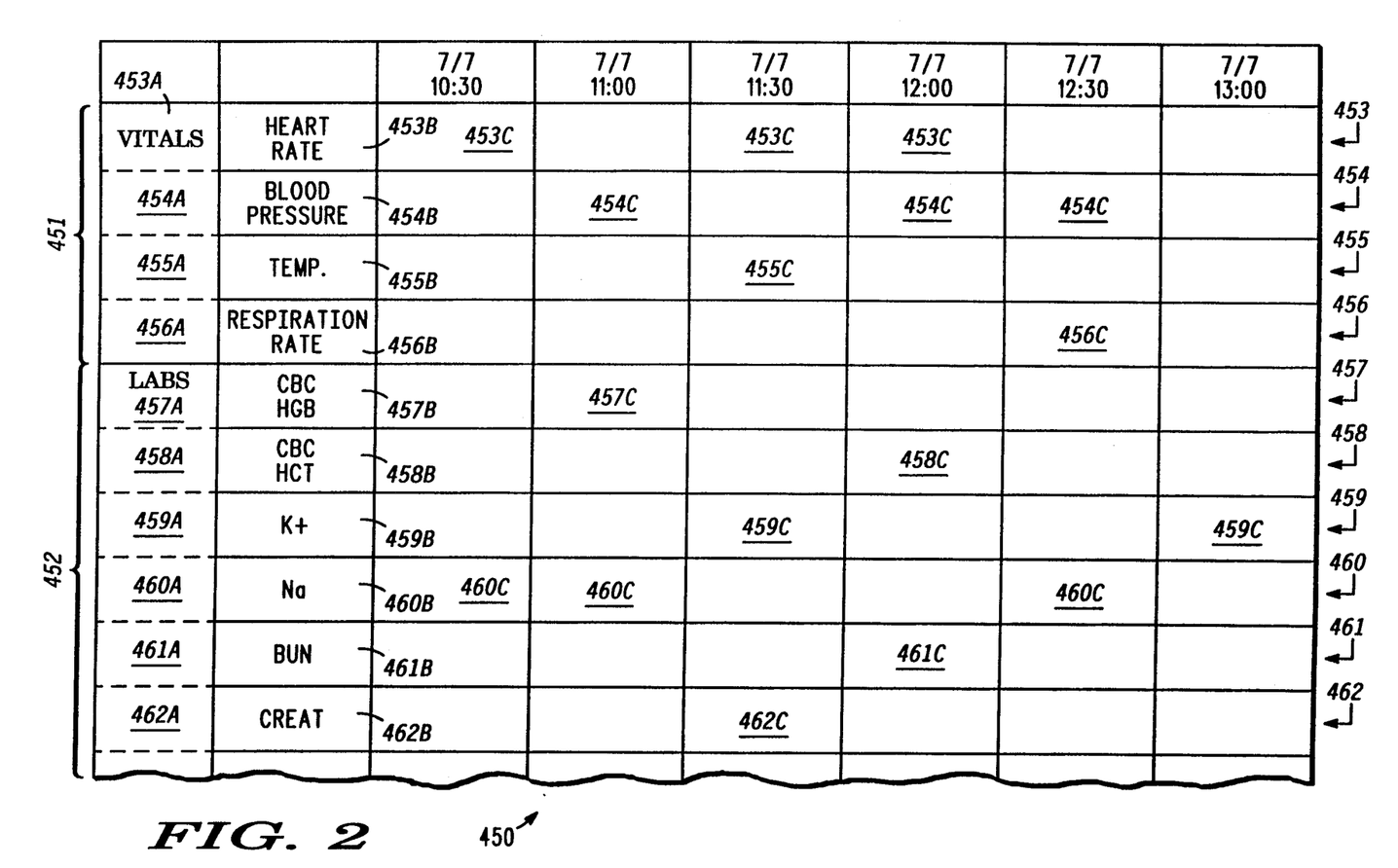
FIG. 2 is an illustration of a display screen of said data processing system.

Referring now to FIG. 2, a display area portion of an information screen showing a vitals group 451 and a labs group 452 of a patient record is illustrated. Each group is further divided into several tiles. Vitals group 451 is divided into tiles 453-456 which correspond to vitals parameters: heart rate; blood pressure, temperature, and respiration rate, respectively. Labs group 452 is divided into tiles 457-462 which correspond to labs parameters CBC HGB, CBC HCT, K+, Na, BUN, and CREAT, respectively.

Form 450 is also divided into several columns. The first column, a group column, contains group cells 453A-462A. Of these, only cells 453A and 457A are utilized to show the group divisions. The second column, a parameter column, contains parameter cells 453B-462B. Each of these parameter cells is utilized to indicate the parameter for which the data cells contain information. The remaining columns are comprised of data cells 453C-462C arranged in relation to time intervals.

Figure 3:
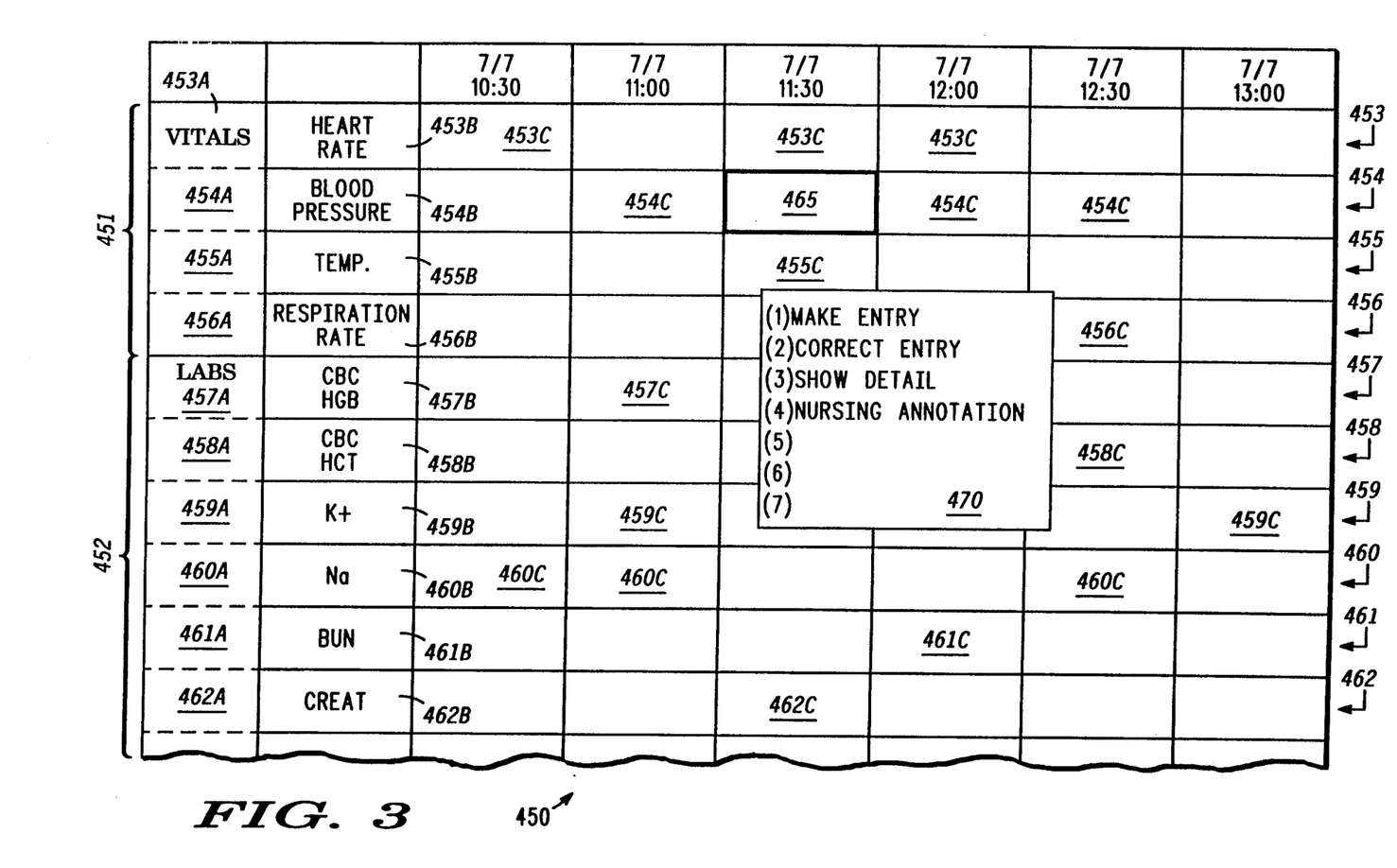
FIG. 3 is an illustration of the screen of FIG. 2 showing a selection window.

Referring now to FIG. 3, form 450 of FIG. 2 is illustrated with a pop-up window 470 which appears upon selection of a data cell, such as data cell 465. Generally, window 470 will provide several options consisting of: making an entry, correcting an entry, showing detail, and making a nursing annotation to the data cell.

Figure 4:
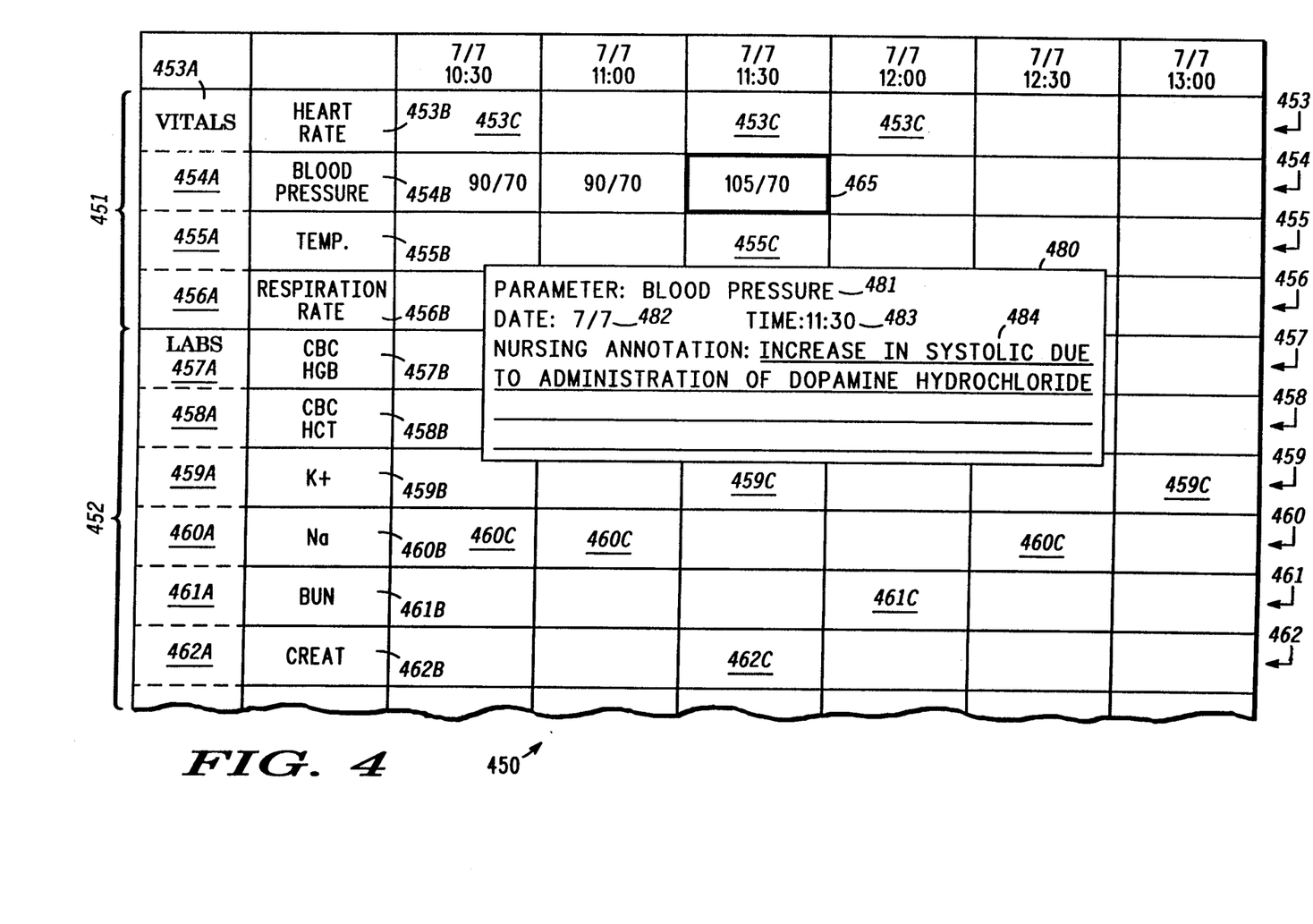
FIG. 4 is an illustration of the screen of FIG. 2 showing the annotation window.

In FIG. 4, a nursing annotation window 480 is illustrated. Window 480 provides a parameter title 481, date 482, time 483, and a place for the nursing annotation 484. As shown, form 450 has data entered for the blood pressure parameter at 10:30, 11:00, and 11:30. The parameter ,or which the annotation is being made is the 11:30 entry. This annotation will then be saved in the data base along with the other data for cell 465.

If the "SHOW DETAIL" selection was made from window 470 of FIG. 3, following the entry of the nursing annotation, a window 486 would be displayed, FIG. 5. Show detail window 486 provides a parameter 487, date 488, time 489, systolic pressure 490, diastolic pressure 491, average pressure 492, date entered 493, time entered 494, entry by 495, and the nurse annotation 496. This data is stored in the data base as a single data object having multiple fields. A notation (such as $a_1$, $a_2$, etc.) is illustrated in cell 465 to show that there is an annotation associated with cell 465. The indicator al shows that this was the first (or the same as the first) annotation for that time period. If a subsequent annotation is entered in the same time period, it will be designated $a_2$, as shown in cell 466. If a subsequent annotation is entered in the same time period and is the same as a previously entered annotation, the subsequent annotation is given the same notation, as shown in cell 467. In the next time period, the notations start over with al as in cell 468. Notations are described in more detail in copending patent application "A Method for Displaying Information from an Information Based Computer System" having Ser. Number 07/407,836.

Figure 6:
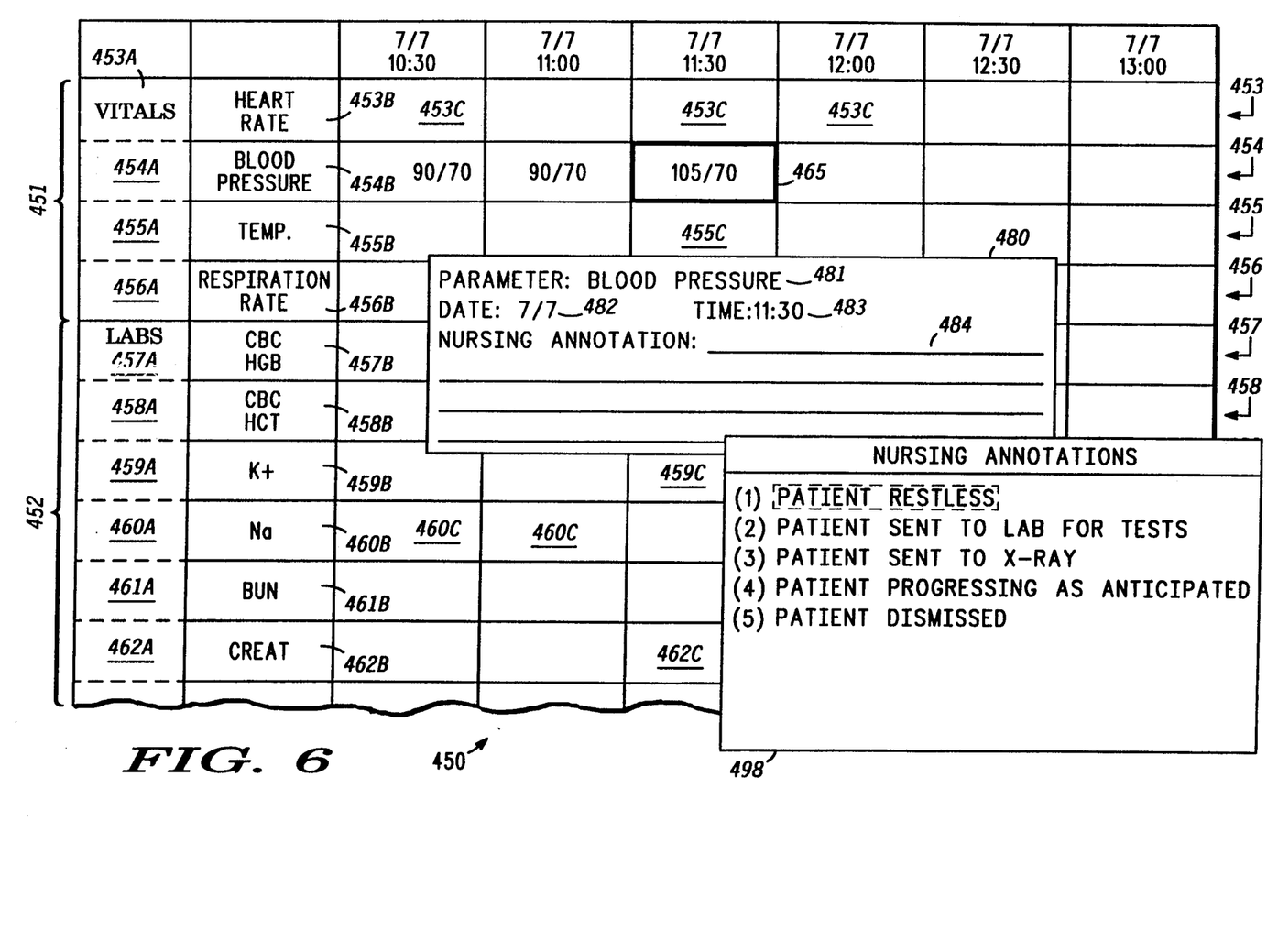
FIG. 6 is an illustration of the screen of FIG. 4 showing a window of predefined annotations.

Additionally, when an annotation is to be entered, such as in FIG. 6, a window 498 may be displayed. Window 498 provides a list of predefined, commonly used annotations. By selecting one of the annotations from window 498, that annotation will automatically be placed into annotation field 484 of window 480.

Figure 7A:
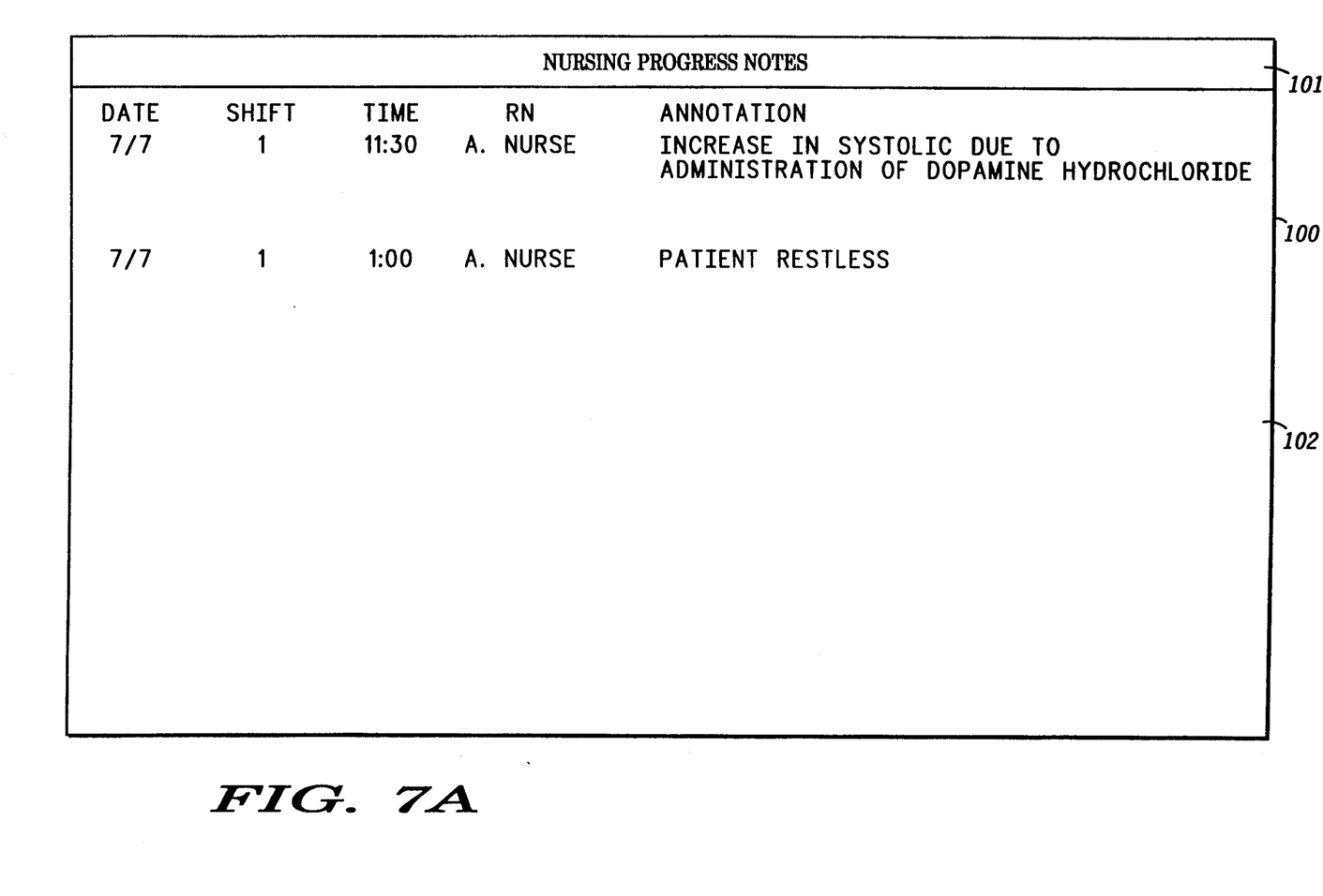
FIGS. 7A and 7B are display screens showing nursing progress notes with annotations.
Figure 7B:
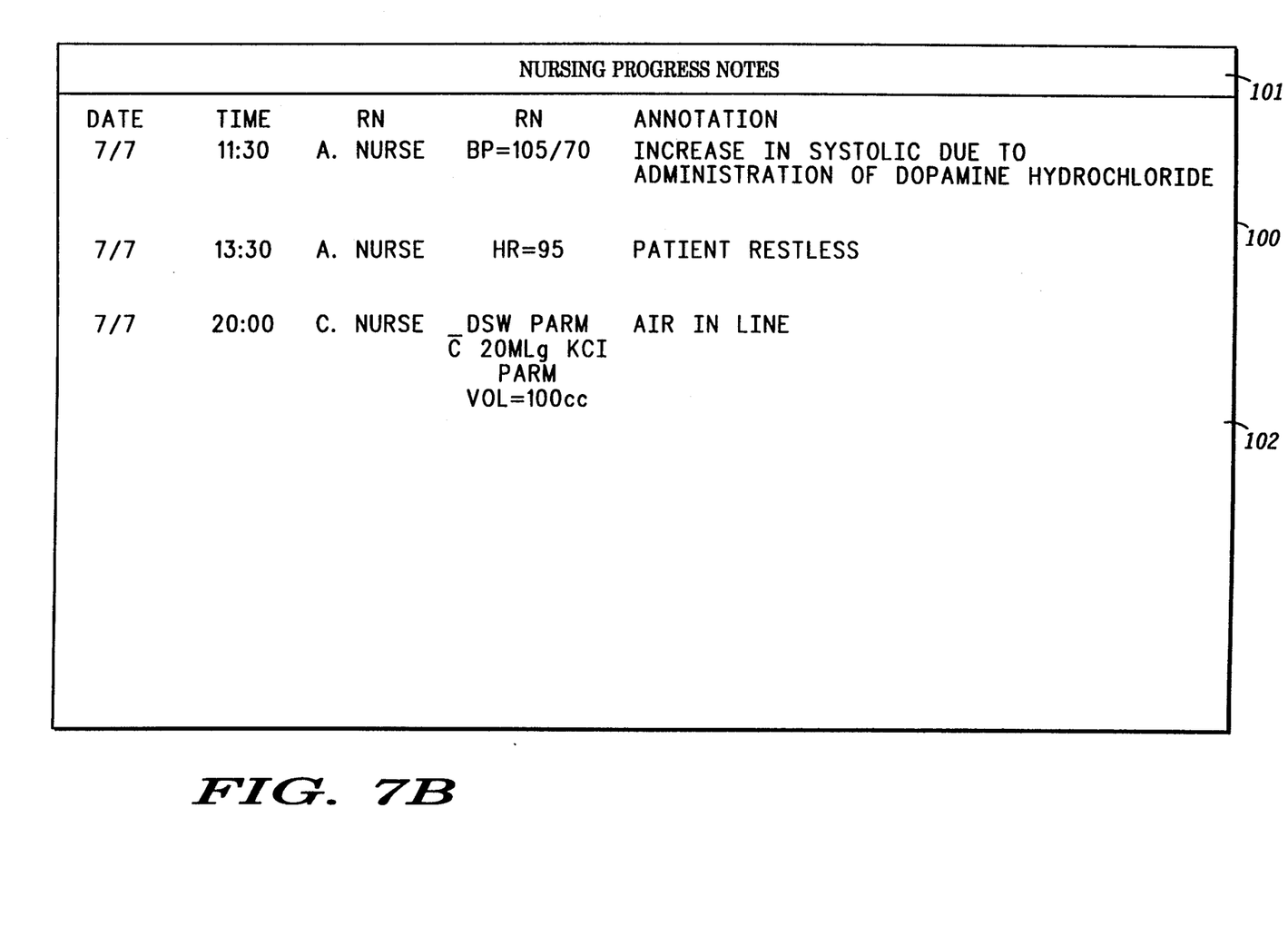

Referring now to FIGS. 7A and 7B, display screens, generally designated 100, showing nursing progress notes are illustrated. Screens 100 consist of title sections 101 and annotation sections 102. In one particular embodiment, as annotations are made and saved to various other forms, such as those of FIGS. 2-6, the annotations are also stored in the nursing progress notes. Additionally, annotations may be entered directly into the nursing progress notes. In FIG. 7B, parameter information from the annotated cell is provided. In the first two entries of FIG. 7B, the displayed parameter is provided (BP=107/70 and HR=95). In the third entry, in addition to the primary parameter (D5W RARM), additional information from the object instance is provided. The additional information here consists of $-\bar{c}$ 20 MEq KCl RARM Vol=100cc—indicating the additive and flow rate of an intravenous (IV) solution. The type of parameters displayed here are preset in the system. Therefore, any or all of the information of a particular object instance may be displayed in the annotation depending upon how the object class is defined. This definition will also specify the manner in which the parameter(s) is (are) to be displayed.

Figure 8:
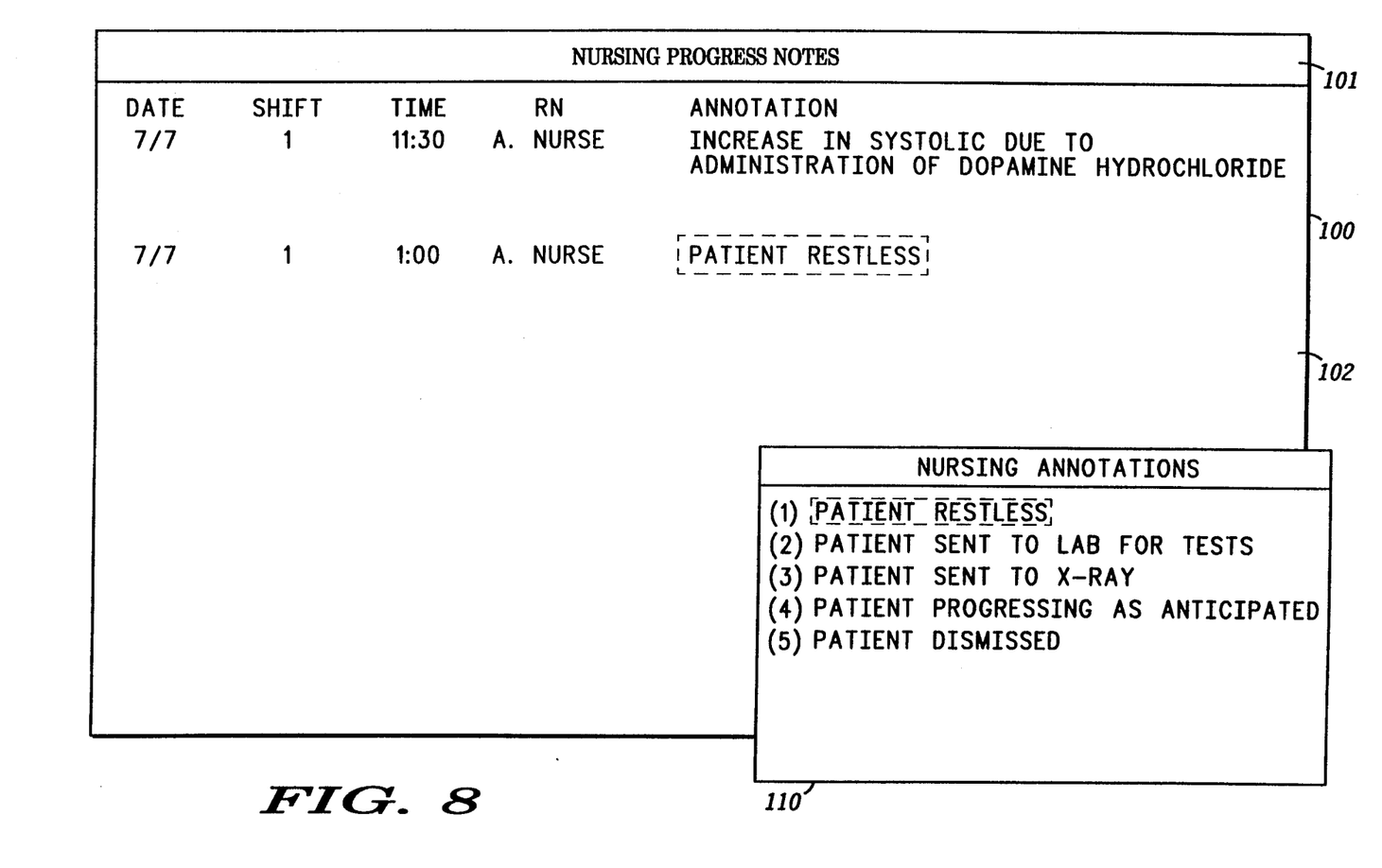
FIG. 8 is the display screen of FIG. 7 showing the nursing progress notes with a window of predefined annotations.

In FIG. 8, a second embodiment of the present invention is illustrated. This embodiment provides a window 110 of predefined, commonly used nursing annotations for the nurse to select from. With window 110, the nurse may select an option, such as option 1 and have it automatically transferred to nursing progress notes 100. The date, shift, and time would then need to be entered for the annotation. The RN entry for the annotation may either be made by the nurse or automatically made by the system.

Figure 9:
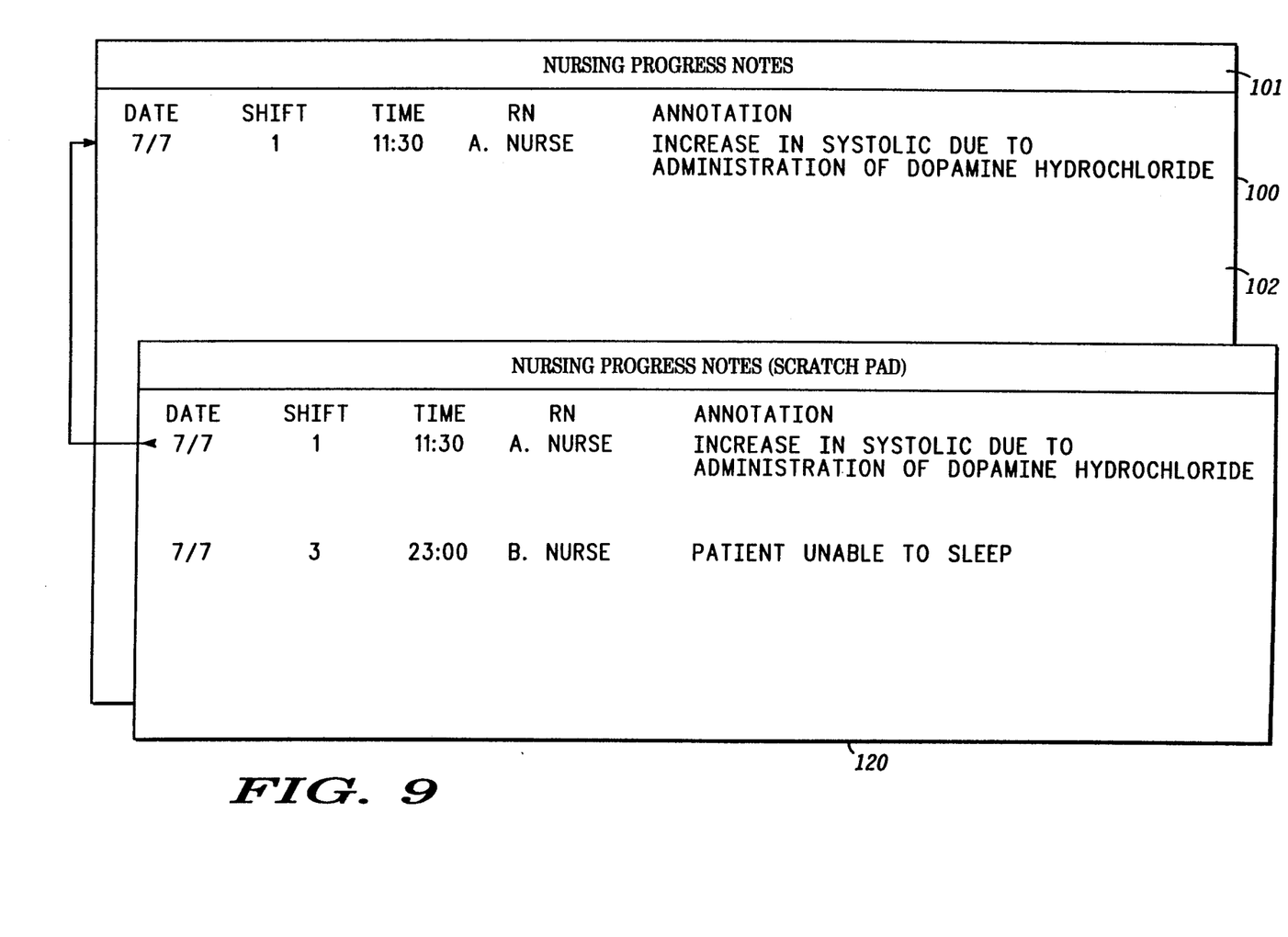
FIG. 9 is a display screen showing the nursing progress notes of FIG. 7 with an annotation scratch pad.

Another example of the present invention is illustrated in FIG. 9 where a Nursing Progress Notes (Scratch Pad) window 120 is provided. In this example, the annotations made by a nurse are consolidated on the scratch pad illustrated in window 120. These annotations may then be copied to Nursing Progress Notes 100 as they are; copied and modified; or not copied, in which case they would eventually be deleted from the scratch pad.

Figure 10:
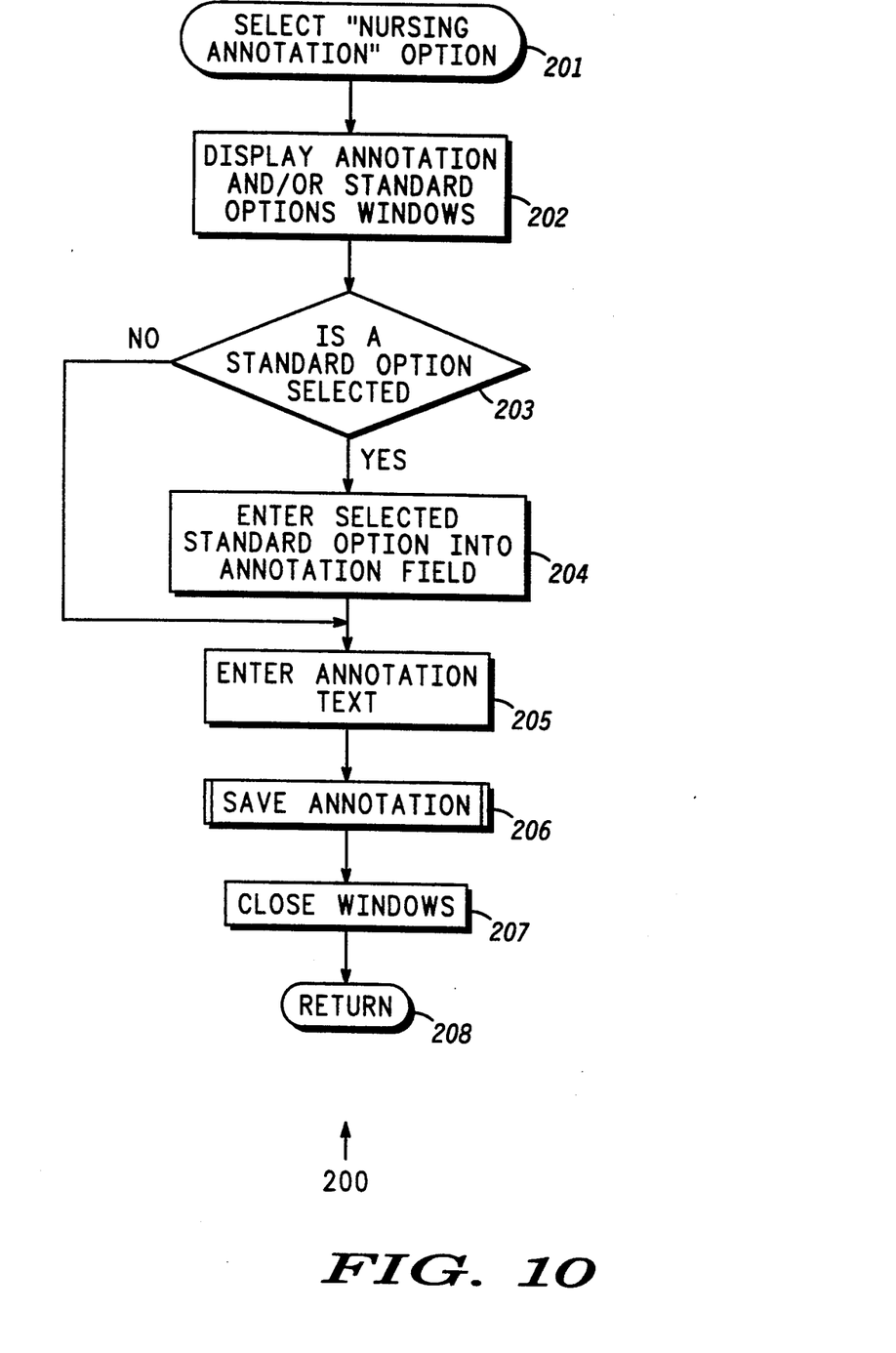
FIG. 10 is a flow chart illustrating the annotation entry process embodying the present invention.

Referring now to the flow chart of FIG. 10, an annotation entry process, generally designated 200, embodying the present invention is illustrated. Process 200 commences with the selection of the "Nursing Annotation" option, step 201. The annotation window, such as window 480 of FIG. 4 is displayed, step 202. At this point, the standard annotation options, such as shown in window 110 of FIG. 8 may also be displayed, step 202.

Next, in decision step 203, if a standard option is selected from the standard annotation options, process 200 continues on to step 204. In step 204, the standard option selected is entered into the annotation field of the cell. If a standard option is not selected, step 203, or following step 204, the process allows entry of text into the annotation field, step 205.

Following step 205, the annotation is saved, subprocess 206. Subprocess 206 will be described in more detail below. The windows are then closed, step 207, and the process returns, step 208.

Figure 11A:
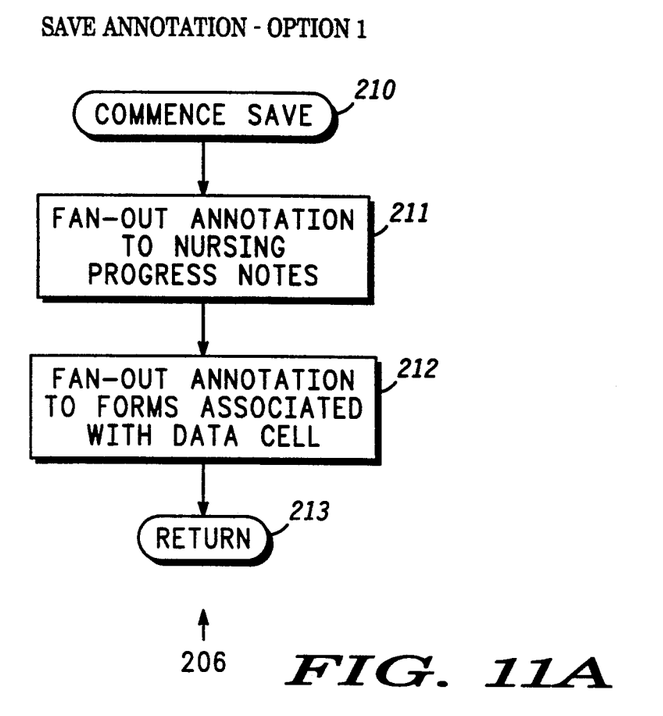
FIGS. 11A-11D are flow charts illustrating several embodiments of the transcription process of the present invention.

Referring now to the flow charts of FIGS. 11A-11D, two embodiments of transcription subprocess 206 of process 200 are illustrated. In FIG. 11A, subprocess 206 commences at step 210. The annotation is then fanned-out to the nursing progress notes, step 211. This embodiment of the subprocess is used if there is a separate file, or object, for nursing progress notes.

If the annotation is also relevant to other forms, the annotation is then fanned-out to any other summary forms associated with the data cell, step 212. The subprocess then returns, step 213.

Figure 11B:
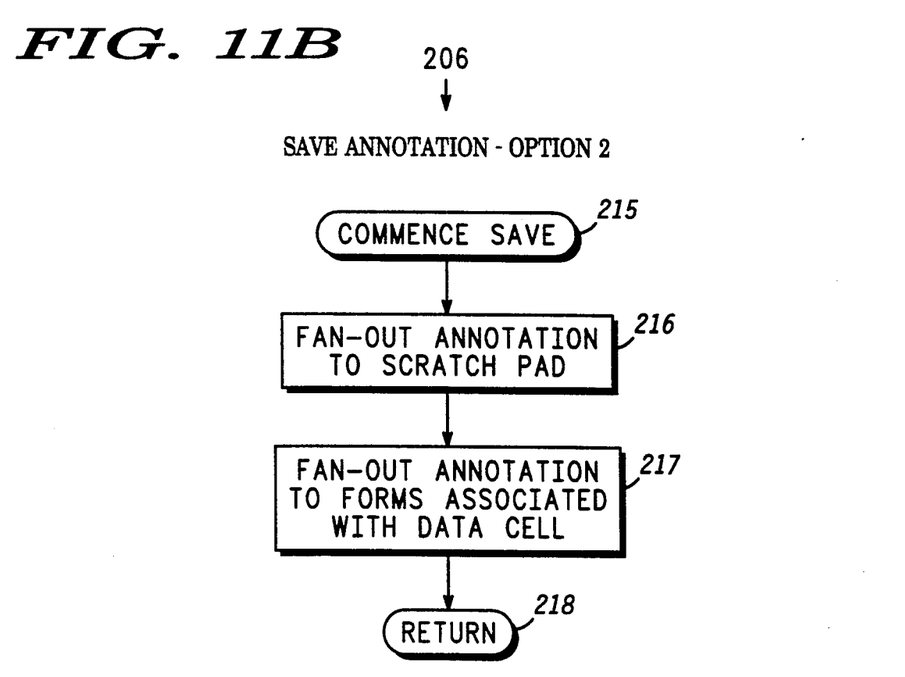

In FIG. 11B, subprocess 206 commences at step 215. The annotation is then fanned-out to a scratch pad, step 216. This embodiment of the subprocess is used if a scratch pad is provided as a temporary file for annotations.

Again, the annotation is also fanned-out to other summary files which are associated with the data cell annotated, step 217. The subprocess then returns, step 218.

Figure 11C:
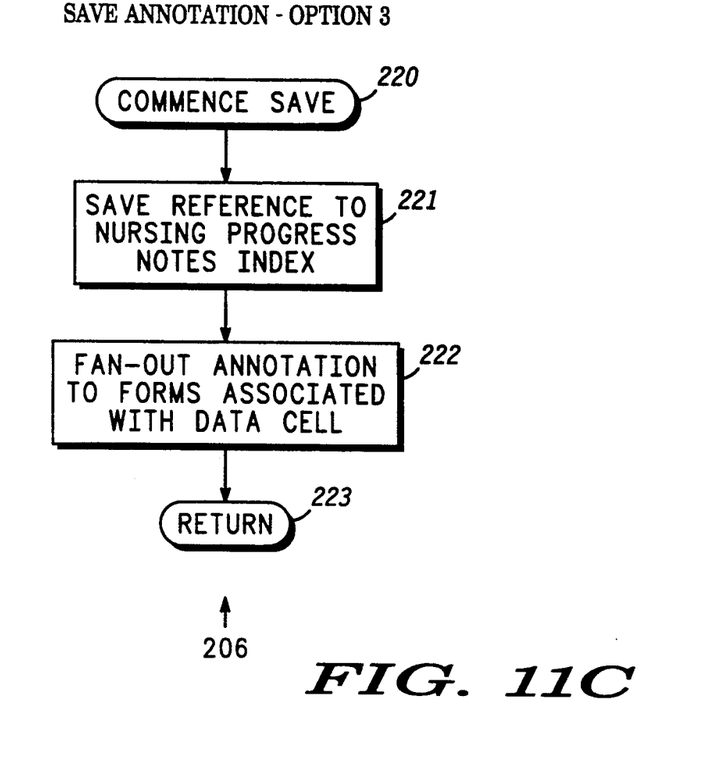

A third embodiment of the transcription process is illustrated in FIG. 11C. Subprocess 206 commences at step 220 and proceeds to save a reference to the annotated data object in a nursing progress notes index, step 221. This index would be used later to retrieve the annotations. The fan-out to other objects is then performed in step 222 and the process ends, step 223.

Figure 11D:
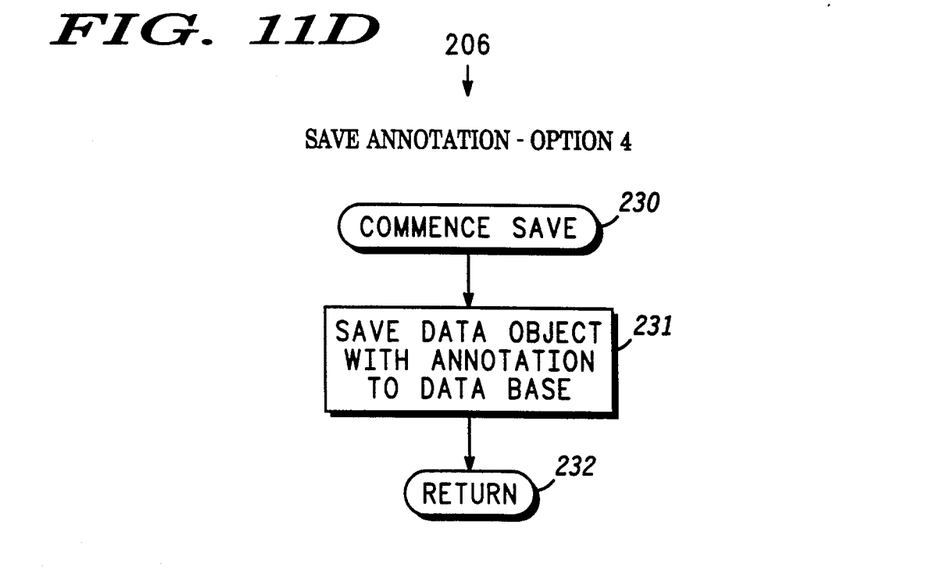

Another embodiment of the transcription process is shown in the flow chart of FIG. 11D. Subprocess 206 commences at step 230 and saves the annotated data object to the data base, step 231. The process then returns, step 232. In this embodiment, the process will not establish a separate file for the nursing progress notes. Instead, when the annotations are to be viewed, the system will search the data base for items having annotations and copy the annotations to a temporary file.

Figure 12B:
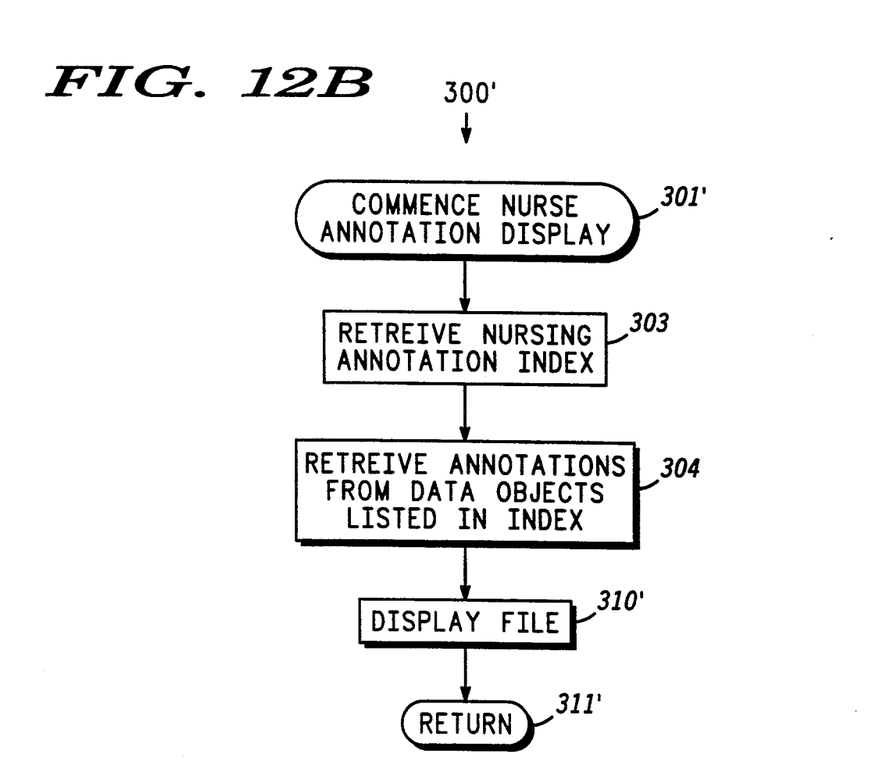
Figure 12C:
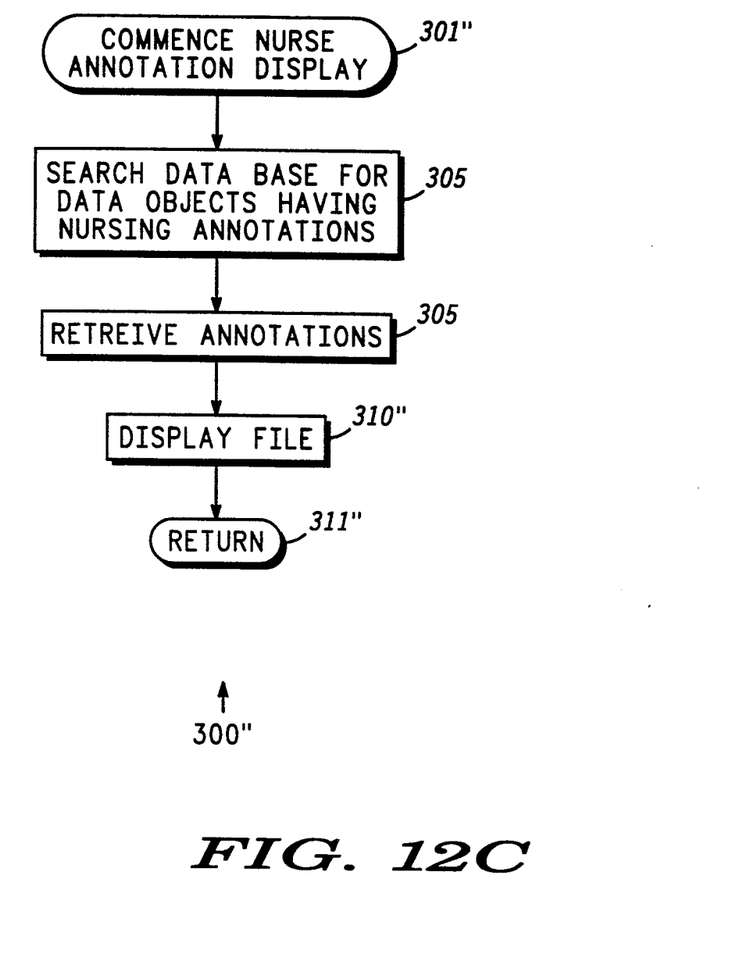

Turning now to the process of retrieving the annotations, FIGS. 12A-12C illustrate several different embodiments of the process used by the present invention. Starting with FIG. 12A, a process 300 commences with step 301. A nursing annotation file (data object) containing all of the nursing annotations is then retrieved from the data base, step 302, and displayed, step 310. The process then ends. Process 300 is used in the situation where a nursing annotation file is maintained and updated as annotations are made to the various data objects.

Step 311 of displaying the annotations may be either displaying the nursing progress notes or displaying a scratch sheet of nursing progress notes. If the later is the case, the nurse may then copy the desired notes from the scratch sheet to a permanent file.

In FIG. 12B, process 300' commences with step 301'. A nursing annotation index is then retrieved, step 303. Annotations are retrieved from data objects referenced in the index, step 304. The annotations are then displayed, step 310', and the process returns, step 311'.

Again, if the display of step 310' is a scratch pad, the annotations may be copied into a permanent file.

Another embodiment of the present invention is demonstrated by process 300" of FIG. 12C. The process commences with step 301" and then searches the data base for data objects having nursing annotations, step 305. The annotations are then retrieved from the identified data objects, step 306, and the file (or scratch pad) displayed, step 310". Process 300" then returns, step 311".

As described above, a process has been shown which accomplishes the objectives of providing fan-out of annotations. Further, annotations are gathered and consolidated into a single file. In addition, a scratch pad is provided for temporary use in transferring annotations.

Thus, it will be apparent to one skilled in the art that there has been provided in accordance with the invention, a method that fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

We claim:

1. A method executed by a computer as directed by a computer program for annotating data in a database, a display being coupled to said computer and displaying a spreadsheet comprising a plurality of data cells, said method comprising the steps of:
   (a) selecting a first data to be annotated;
   (b) annotating said selected first data by entering a first annotation text into said computer;
   (c) storing said first annotation text in said database;
   (d) assigning a first notational designator to said first annotation text;
   (e) assigning a first notational designator in said first selected data cell to indicate that annotation text is associated with said selected first data cell;
   (f) selecting a second data cell to be annotated;
   (g) annotating said selected second data cell by entering a second annotation text into said computer;
   (h) storing said second annotation text in said database;
   (i) comparing said second annotation text with said first annotation text, if said first annotation text is associated with said selected second data cell;
   (j) assigning said first notational designator to said second annotation text if said second annotation text is similar to said first annotation text, otherwise assigning a second notational designator to said second annotation text, said second notational designator indicating the existence of said first annotation text; and
   (k) displaying said second notational designator in said second data cell to indicate that annotation text is available with said selected second data cell.

2. A method as recited in claim 1, further comprising the steps of:
   (e) displaying a plurality of annotations texts on said display;
   (f) selecting one of said annotation texts; and
   (g) annotating said selected data cell by storing said selected one of said annotation texts in said data base.

3. A method as recited in claim 1, wherein a plurality of forms is associated with one or more of said data cells of said spreadsheet, said forms comprising nursing progress notes, said method further comprising the steps of:
   (e) searching said data base for one or more of said forms which are associated with said selected data cell;
   (f) storing a reference in said data base to said annotation text associated with said selected data cell to said one or more of said forms; and
   (g) displaying said annotation text if said one or more of said forms is selected to be displayed.

* * * * *